United States Patent [19]

Ota

[11] Patent Number: 5,237,779
[45] Date of Patent: Aug. 24, 1993

[54] APPARATUS FOR DETECTING MACHINING CONDITIONS IN A MACHINE TOOL

[75] Inventor: Masato Ota, Narashino, Japan
[73] Assignee: Seiko Seiki Kabushiki Kaisha, Japan
[21] Appl. No.: 559,843
[22] Filed: Jul. 30, 1990
[30] Foreign Application Priority Data Aug. 15, 1989 [JP] Japan .................................. 1-209621

[51] Int. Cl.$^5$ ............................................ B24B 49/04
[52] U.S. Cl. ................................ 51/165.71; 51/165 R; 51/165.76
[58] Field of Search ........... 51/165.71, 165.93, 165.77, 51/165.76, 165.8, 165 R, 290

[56] References Cited

U.S. PATENT DOCUMENTS

| | | | |
|---|---|---|---|
| 3,829,750 | 8/1974 | Centner et al. ................... | 51/165.71 |
| 3,905,161 | 9/1975 | Tomita ............................. | 51/165.77 |
| 4,604,834 | 8/1986 | Thompson ....................... | 51/165.71 |

FOREIGN PATENT DOCUMENTS

| | | | |
|---|---|---|---|
| 0263489 | 1/1989 | Fed. Rep. of Germany ... | 51/165.87 |
| 0630064 | 9/1978 | U.S.S.R. ......................... | 51/165.93 |

*Primary Examiner*—Robert A. Rose
*Attorney, Agent, or Firm*—Bruce L. Adams; Van C. Wilks

[57] ABSTRACT

An apparatus for detecting machining states of a workpiece in a machine tool comprises a non-contact type displacement detector for detecting a radial bending displacement of a spindle in a region between a machining point and a front bearing of a tool spindle or a work spindle. The displacements correspond to states under which the machine tool starts operating, and the tool contacts the workpiece to various unfinished faces, a machining state and a machining surface condition of the workpiece during machining. By inputting the detection signal to different frequency band pass filters, the machining states and the workpiece surface condition are discriminated. A set of comparators compare the output signals from the frequency band pass filters with set reference values. The respective machining states are judged from the comparative results. Comparative judgment signals are inputted to a control unit, thereby controlling the machine tool to automatically perform appropriate machining operations.

20 Claims, 3 Drawing Sheets

FIG. 3

STEP 1
ATTACH A WORKPIECE TO THE CHUCK

STEP 2
WORK SPINDLE AND WHEEL SPINDLE START ROTATING

STEP 3
WORK HEAD TABLE AND WHEEL SPINDLE STOCK MOVE FORWARD

STEP 4
WORK HEAD TABLE MOVES FORWARD
OPERATION OF THE GRINDING/MACHINING STATE
DETECTION DEVICE STARTS

STEP 5
OPERATION IS CHANGED OVER TO ROUGH GRINDING

STEP 6
ROUGH GRINDING

STEP 7 $f_3 \leq R_3$ — NO → REDUCE A TARGET VALUE OF THE ROUGH GRINDING FORCE TILL $f_3 = R_3$
YES

STEP 8 CONTINUE ROUGH GRINDING

STEP 9
OPERATION IS CHANGED OVER TO FINE GRINDING

STEP 10 $f_2 \leq R_2$ — NO → PERFORM ANY ONE OF PROCESSES (1), (2), (3) OR (4)
YES

STEP 11 CONTINUE FINE GRINDING

STEP 12
WORK HEAD TABLE STOPS; PERFORM SPARK-OUT

STEP 13
WORK HEAD TABLE MOVES BACK

STEP 14
WORK HEAD TABLE AND WHEEL SPINDLE STOCK
RETURN TO ORIGINAL POSITIONS

STEP 15
WORK SPINDLE STOPS ROTATING
DETACH THE WORKPIECE, ATTACH NEXT ONE TO THE CHUCK

APPARATUS FOR DETECTING MACHINING CONDITIONS IN A MACHINE TOOL

BACKGROUND OF THE INVENTION

The present invention relates to an apparatus for detecting machining states of a workpiece in a machine tool during a machining process.

Based on prior art techniques for detecting machining states in a machine tool during a machining process, variables for detection are a machining force, vibrations, sounds, heat and machining power or machining dimensions (residual stock removal amount).

Case of machining force

The machining force is detected by use of (1a) a distortion gauge or a piezoelectric element which are mounted on a work holder of a milling machine or a tool holder on a lathe and (1b) a distortion gauge mounted on a work holding for external cylindrical grinder center or on the basis of (1c) variations in pocket pressure of a hydrostatic fluid bearing which supports a tool (workpiece) spindle.

Case of Vibrations and Sounds

The vibrations and sounds are detected by use of (2a) an AE sensor or a vibration sensor which are provided on the work holder, the tool holder, work holding center or a work holding shoe and (2b) one AE sensor or the vibration sensor which are attached to the tool (workpiece) spindle supported by rolling bearing.

Case of Heat (3) The heat is detected by heat detection sensors embedded in the workpiece or the tool.

Case of Machining Power

The detection of the machining power involves a detection of rotary driving power of the tool (workpiece) spindle.

Case of Machining Dimensions (Residual Stock Removal Amount

The machining dimensions are detected on the basis of a difference between a feed amount and removed amount during the machining process.

The following are defects inherent in the above-mentioned techniques for detecting the machining states.

Case of Machining Force.

The detection of machining force is (1a) limited to a case where the workpiece is movable within a given range as well as restricting a support rigidity thereof, (1b) limits the workpiece which must be held between conical centers, and (1c) is limited in slow.

Case of Vibrations and Sounds

The detections of vibrations and sounds are only effective for abnormal state detection and not effective for normal state detection, and (2b) sensing through the bearing, a vibration amplitude is diminished also S/N ratio is lowered because of detecting rolling vibrations of the hearing.

Case of Heat

The detection of heat is (3) not practical at production shop and has slow respondency as well.

Case of Machining Power

The detection of machining power is (4), in addition to a slow respondency detection is, limited to the tangential force to the workpiece surface and this method is insufficient for a grinding process wherein the force variations in a normal to the surface are large.

Case of Machining Dimensions (Residual Stock Removal Amount);

The detection of machining dimensions is slow of respondency because of being detected after effecting the machining process.

In any case, these detecting methods have slow respondency or are not accurate enough. Besides, the above-mentioned methods are simple condition-detecting methods have but not yet reached a level to analyze various states by highly accurate detection and to output a signal capable of effecting the corresponding control over the machine tool.

SUMMARY OF THE INVENTION

It is an object of the present invention to provide an apparatus for detecting real time machining states of a workpiece in a machine tool with high accuracy and for analyzing and controlling various machining states.

The apparatus for detecting machining states in a machine tool according to the present invention comprises: a non-contact type displacement detector for detecting a radial displacement of a work spindle or a tool spindle between the machining point and a spindle bearing; a plurality of frequency band pass filters, connected to the non-contact type displacement detector, to which detection signals of the non-contact type displacement detector are inputted; and comparators for comparing output signals of the plurality of frequency band pass filters with respective set values.

Detected by the non-contact type displacement detector are radial displacements of the work spindle or the tool spindle to between the machining point and the spindle bearing The displacements correspond to a state under which the machine tool starts operating, and the tool contacts the workpiece of various unfinished faces, a machining state and a surface state of the workpiece during machining. As a result of inputting the detection signals to the frequency band pass filters, the machining states and the workpiece surface states are discriminated. The comparators compare the output signals from the frequency band pass filters with set reference values. The respective states are judged from the comparative results. Comparative judgment signals are inputted to the control unit, thereby controlling the machine tool to automatically perform appropriate machining operations.

BRIEF DESCRIPTION OF THE DRAWINGS

FIG. 3 is a flowchart showing control processes of the internal grinding machine incorporating the grinding/machining state detecting apparatus in the embodiment of the invention.

DETAILED DESCRIPTION OF THE PREFERRED EMBODIMENTS

An embodiment of the present invention will hereinafter be described referring to the accompanying drawings.

There is exemplified an internal grinding machine as a machine tool to which an apparatus for detecting machining state according to the present invention is applied.

Figure 1:
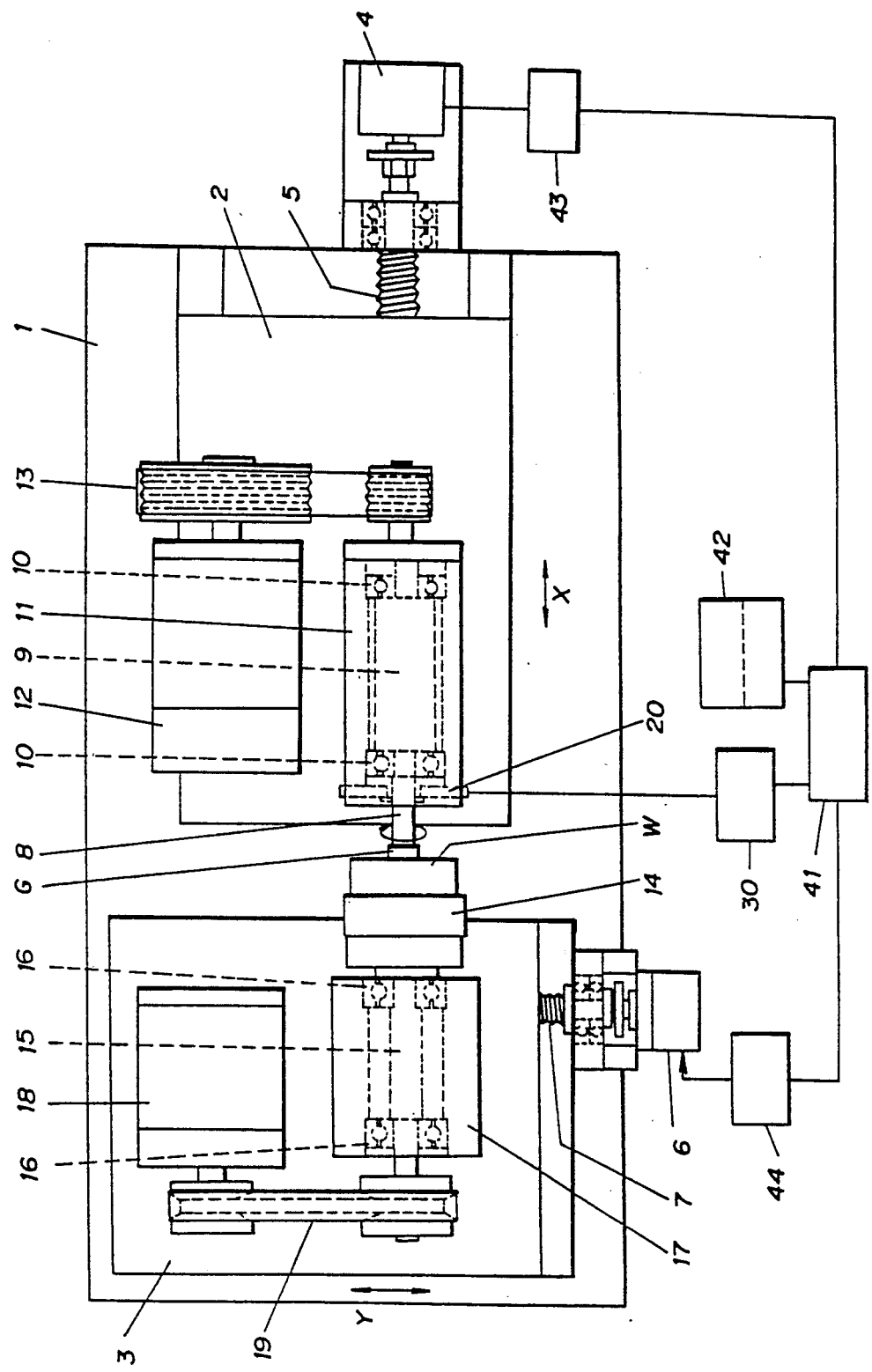
FIG. 1 is partly a plan view of an internal grinding machine in an embodiment of the present invention and partly a block diagram of an apparatus for detecting grinding/machining states incorporated therein.

Mounted on a bed 1 in FIG. 1 are a wheel spindle stock 2 slidable in X-axis directions and a work head table 3 slidable in Y-axis directions. The wheel spindle stock 2 is moved back and forth in the X-axis directions by a servo motor 4 through a feed screw mechanism 5. The work head table 3 is moved to and fro in the Y-axis directions by a servo motor 6 through a feed screw mechanism 7.

A wheel head 11 and a motor 12 are mounted on the wheel spindle stock 2. The wheel head 11 rotatably bears a main wheel spindle 9 fitted at its top end with a wheel spindle 8 of a grinding wheel G with the aid of rolling bearings 10, 10 in the X-axis directions. The main wheel spindle 9 is rotationally driven by the motor 12 via a belt transmission mechanism 13.

Mounted on the work head table 3 are a work head 17 and a motor 18. The work head 17 rotatably bears a work spindle 15 provided at its top end with a chuck 14 with the help of rolling bearings 16, 16 in the X-axis directions. The work spindle 15 is rotationally driven by the motor 18 via a belt transmission mechanism 19.

A grinding program control unit equipped with the machining state detecting apparatus is composed of: a non-contact type displacement detector (e.g., an optical sensor, an electromagnetic induction sensor, a capacitance sensor or an eddy current sensor) 20; a grinding-/machining state detecting circuit 30 for processing and judging detections signals inputted from the displacement detector 20; a process monitor 41; a sequence program unit/numerical control unit 42; and feed driving circuits 43 and 44.

The displacement detector 20 is disposed adjacently to the rolling bearing 10 on the side of the wheel spindle 8. The detector 20 is provided to detect a radial displacement(radial displacement of the wheel spindle itself and deflective displacement or any one of these displacements; the definition is the same hereinafter) of the wheel spindle 8 in cutting-axis (y-axis) directions in the wheel head 11.

Figure 2:
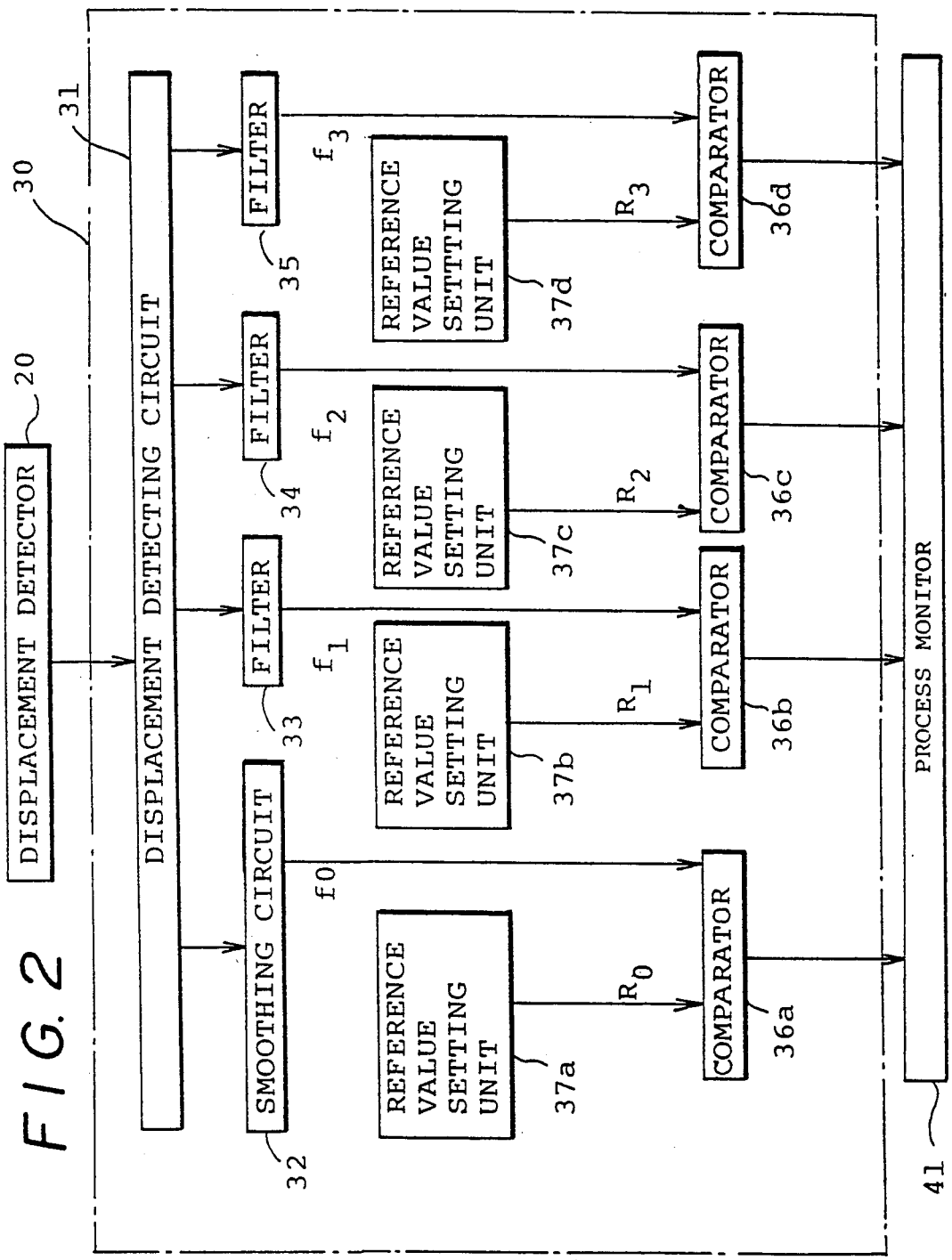
FIG. 2 is a block diagram illustrating a grinding/machining state detecting, circuit of the grinding/machining state detecting apparatus in the embodiment of the invention.

As depicted in FIG. 2, the grinding/machining state detecting circuit 30 consists of a displacement detecting circuit 31, a smoothing circuit 32, a workpiece rotational frequency band pass filter 33, a workpiece rotational frequency partial band pass filter 34, a wheel spindle rotary bending resonant frequency band pass filter 35, comparators 36a through 36d and reference value setting units 37a through 37d. These components are connected to operate in the following manner.

The displacement detecting circuit 31 converts displacement detecting signals output from the displacement detector 20 into voltages. The thus converted displacement detecting signals are inputted respectively to the comparators 36a through 36d via the smoothing circuit 32 (for time-averaging the displacement signals), the workpiece rotational frequency Nw band pass filter 33 (Nw pass filter), the workpiece rotational frequency partial band pass filter 34 (Nw to nNw pass filter where n is an integer number but nNw is lower than the tool spindle rotation frequency) and the wheel spindle rotary bending resonant frequency band pass filter 35 (Nc pass filter). Inputted to the comparators 36a through 36d are set reference value signals set in the reference value setting units 37a through 37d. The comparators 36a through 36d compare the inputted displacement detecting signals with the set reference value signals. If there are differences therebetween, difference signals are inputted to the process monitor 41.

The process monitor 41 and the sequence program unit/numerical control unit 42 input command signals to driving circuits 43 and 44 of the feed servo motors 4 and 6. The servo motor 4 connected to the driving circuit 43 is controllably driven by the driving circuit 43. The servo motor 6 connected to the driving circuit 44 is controllably driven by the driving circuit 44.

Descriptions will be given of the operation and function of the grinding program control unit.

Grinding/machining processes will be demonstrated by FIG. 3.

The operation starts with chucking a workpiece W by use of a chuck 14 (step 1).

A motor 18 rotates at a predetermined velocity in response to a command from the sequence program unit/numerical control unit 51. As a result, the work spindle 15, i.e., the workpiece W is rotationally driven via the belt transmission mechanism 19. Simultaneously, the motor 12 functions to rotationally drive the main wheel spindle 9, viz., the grinding wheel G through the belt transmission mechanism 13 (step 2).

The servo motor 6 is controlled by the control unit and operates to move forward (downward in FIG. 1) the work head table 3 via the feed screw mechanism 7. A hollow portion of the workpiece W is positioned to confront the grinding wheel G. On the other hand, the servo motor 4 is controlled by the control unit and operates to move forward (leftward in FIG. 1) the wheel spindle stock 2 through the feed screw mechanism 5. The grinding wheel G is forced to enter the hollow portion of the workpiece W (step 3).

The work head table 3 is advanced at a slightly high gap-eliminate velocity by the actuation of the servo motor 6. Then starts the operation of the grinding/machining state detecting unit(step 4).

The displacement detector 20 dynamically detects a radial displacement (the radial displacement and a deflective displacement of the wheel spindle itself or any one of these displacements) of the wheel spindle 8. Upon a detection of the radial displacement, a displacement detection signal is inputted to the displacement detecting circuit 31, wherein the displacement detection signal is converted into a voltage signal. The voltage signals are inputted to the smoothing circuit 32, workpiece rotational frequency band pass filter 33, workpiece rotational frequency partial band pass filter 34, wheel spindle rotary bending resonant frequency band pass filter 35 respectively. As a consequence of detecting the radial displacement with the displacement detector 20, there are obtained the displacement detection signals having frequencies corresponding to the respective workpiece surface conditions and grinding conditions.

Till the grinding wheel G contacts an inner peripheral face of the workpiece W, a detected displacement signal mainly of a spindle rotation frequency Ng component depending on a rotational accuracy of the wheel spindle 8 is inputted to the displacement detecting circuit 31. There is, however, no output signal from the respective filters.

The grinding wheel G contacts the inner peripheral surface of the workpiece W. Then starts the grinding process. At this time, the displacement detecting signal corresponding to a condition of the inner peripheral surface of the workpiece is added to the detected displacement signal mainly of the spindle rotation frequency Ng component depending on the rotational accuracy of the wheel spindle 8. The added signals are inputted displacement detecting circuit 31. The detecting signal is then outputted from any one of the smoothing circuit 32, the workpiece rotational frequency band pass filter 33 and the workpiece rotational frequency partial band pass filter 34.

For instance, if neither eccentricity nor distortion appears on the inner peripheral face of the workpiece W, a detecting signal $f_0$ coming from the smoothing circuit 32 is to be outputted.

If the inner peripheral face of the workpiece W undergoes a sectional distortion to assume an ellipse, 3-lobe or . . . n-lobe shape, detecting signals $f_2$ of each partial frequency band is outputted from the band pass filter 34 prior to the detecting signal $f_0$. If the inner peripheral surface of the workpiece W is eccentric with respect to the rotary axial line of the work spindle 15, the first priority is given to outputting of the detecting signal $f_1$ from the band pass filter 33.

The output signals $f_0$, $f_1$ and $f_2$ in any cases are inputted to the comparators 36a through 36c. These output signals are compared with reference values $R_0$, $R_1$ and $R_2$ which are set in the setting units 37a through 37c. As a result of comparison, if greater than the set reference value, the detecting signal is inputted to the monitor 41.

In consequence of this, the servo motor 6 is controlled via the feed driving circuit 44 by signals $A_0$, $A_1$ and $A_2$ outputted from the monitor 41. The operation is changed over to rough grinding (step 5).

Rough grinding is effected with a predetermined rough grinding force. As rough grinding cutting advances, the output signals $f_0$, $f_1$ and $f_2$ typically augment. When the grinding wheel G contacts the entire periphery, the output signals $f_1$ and $f_2$ are reduced down to zero. So long as a cutting ability of the grinding wheel G is not deteriorated, the output signal $f_0$ ceases to increase and is kept constant (step 6).

If the detecting signal $f_3$ from the band pass filter 35 is larger than the reference value $R_3$ set by the setting unit 37d during a rough grinding feed, the detecting signal $A_3$ is inputted to the monitor 41. As a result, a predetermined target value of the rough grinding force in the process monitor 41 is reduced till the detecting signal $f_3$ from the band pass filter 35 reaches the reference value $R_3$ set by the setting unit 37d. The servo motor 6 undergoes control to be decelerated correspondingly via the feed driving circuit 44 (step 7).

Thus, rough grinding continues with a predetermined rough grinding force by which the displacement detecting signal $f_3$ from the band pass filter 35 becomes smaller than the reference value $R_3$ set by the setting unit 37d till reaching a predetermined fine grinding changeover point (step 8).

For example, the servo motor 6 is controlled via the feed driving circuit 44 by the signals outputted from the monitor 41 when inputting, to the process monitor 41, the signals at the time of reaching the fine grinding strength changeover point-i.e., when a residual grinding stock comes to a set value, a sizing signal set by a sizing unit is outputted, a positional signal of the work head table 3 comes to a predetermined level, or the cutting program numerical value reaches a predetermined value (step 9).

If the detecting signal $f_2$ from the band pass filter 34 is not smaller than the reference value $R_2$ set by the setting unit 37c even when coming into the fine grinding process, the detecting signal is inputted to the process monitor 41. On that occasion, any one of the following processes is to be performed.

(1) The predetermined fine grinding operation continues as it is. Even at the termination of fine grinding, if the displacement detecting signal $f_2$ transmitted from the workpiece rotational frequency partial band pass filter 34 is not less than the reference value $R_2$ set by the reference value setting unit 37c, the workpiece W is abandoned.

(2) The predetermined target value of the fine grinding strength in the monitor 41 is reduced till the detecting signal $f_2$ from the band pass filter 34 reaches the reference value $R_2$ set by the setting unit 37c. The servo motor 6 is controlled to decrease the speed through the feed driving circuit 44. Fine grinding continues as it is till a fine grinding ending size is reached.

(3) Fine grinding is immediately stopped, and the workpiece is abandoned.

(4) The predetermined target value of the fine grinding force in the monitor 41 is reduced till the detecting signal $f_2$ from the band pass filter 34 reaches the reference value $R_2$ set by the setting unit 37c. The motor 18 is controlled to reduce the speed correspondingly through the driving circuit (not shown). The number of revolutions of the work spindle 15 is reduced (step 10). The fine grinding operation is effected with the predetermined fine grinding force. In normal fine grinding, only the detected displacement signal mainly of the spindle rotation frequency Ng component substantially depending on the rotational accuracy of the wheel spindle 8 is inputted to the displacement detecting circuit 31. So long as the cutting ability of the grinding wheel G is not deteriorated, the output signal $f_0$ is also decreased and kept constant (step 11).

When the workpiece reaches finishing dimensions by fine grinding, for instance, the sizing signal set by the sizing unit is inputted to the process monitor 41. The servo motor 6 is stopped via the feed driving circuit 44 by the signal outputted from the monitor 41. Then, spark-out is performed. The output signal $f_0$ is also decreased. The detected displacement signal comes to have chiefly the spindle rotation frequency Ng component depending on the rotational accuracy of the wheel spindle 8 (step 12).

Thereafter, the servo motors 4 and 6 are controlled to operate through the feed driving circuits 43 and 44 by the signals outputted from the monitor 41. After the work head table 3 has moved back via the feed screw mechanism 7 (step 13), wheel spindle stock 2 also retreats via the feed screw mechanism 5. The grinding wheel G comes out from inside of the hollow portion of the workpiece W, while the wheel spindle stock 2 returns to its original position. Simultaneously, the work head cable 3 further moves back to the original position (step 14).

The motor 18 is stopped by the command of the sequence program unit/numerical control unit 51, as a result of which the work spindle 15, i.e., the workpiece W stops rotating. The workpiece W is detached and attached for replacement by means of the chuck 14 (step 15).

Machining in the above-described embodiment is internal grinding. It will, however, readily be understood that the present invention can be applied to other grinding and cutting operations.

According to the machining state detecting apparatus of the invention, the states during the grinding/cutting operations are detected with a high accuracy. A variety of states are thereby analytically detected. It is therefore feasible to obtain the output signals capable of correspondingly controlling the machine tool. The machining condition detecting apparatus of the invention makes possible the highly accurate adaptive control of the machine tool.

What is claimed is:

1. An apparatus for detecting machining states of a workpiece in a machine tool which includes a rotating tool and a rotating workpiece, the apparatus comprising:
   non-contact type displacement detector means disposed between at least one of (1) a tool and a tool spindle bearing and (2) a workpiece and a work spindle bearing for detecting a radial bending displacement of at least one of (1) a work spindle and (2) a tool spindle from a reference axis and producing a corresponding detecting signal;
   a plurality of band pass filters coupled to said non-contact type displacement detector means for filtering the detecting signal and providing respective output signals;
   a smoothing circuit coupled to said non-contact type displacement detector means for smoothing the detecting signal and providing an output signal; and
   comparators for comparing each of the output signals of said plurality of hand pass filters and said smoothing circuit with respective reference values.

2. An apparatus according to claim 1, wherein said non-contact type displacement detector means comprises an optical sensor.

3. An apparatus according to claim 1; wherein said non-contact type displacement detector means comprises an electromagnetic induction sensor.

4. An apparatus according to claim 1, wherein said non-contact type displacement detector means comprises a capacitance sensor.

5. An apparatus according to claim 1; wherein said non-contact type displacement detector means comprises an eddy current sensor.

6. An apparatus according to claim 1; wherein one of said plurality of frequency band pass filters comprises a workpiece rotational frequency band pass filter which passes a predetermined frequency component, lower than the rotational frequency of the tool spindle, corresponding to an eccentricity of a machining face of the workpiece relative to the reference axis of the work spindle.

7. An apparatus according to claim 1; wherein one of said plurality of frequency band pass filters comprises a workpiece rotational frequency partial band pass filter which passes a predetermined frequency component, lower than the rotational frequency of the tool spindle, corresponding to multi-lobe distortion of a machine face of the workpiece relative to the reference axis of the work spindle.

8. An apparatus according to claim 1; wherein one of said plurality of frequency band pass filters comprises a tool spindle rotary bending resonant frequency band pass filter which passes a predetermined frequency component of a rotary bending resonant frequency of the tool spindle corresponding to a machining force of the workpiece.

9. An apparatus according to claim 1; wherein said smoothing circuit comprises a low pass filter which cuts off a predetermined frequency component higher than the rotational frequency of the workpiece.

10. An apparatus for detecting machining states of a workpiece, comprising:
    a tool spindle rotatably supported by at least one tool spindle bearing for holding a tool;
    a work spindle rotatably supported by at least one work spindle bearing for holding a workpiece to be machined by the tool;
    detecting means disposed between at least one of (1) the tool and the tool spindle bearing and (2) the workpiece and the work spindle bearing for detecting radial bending displacement of at least one of (1) the tool spindle and (2) the work spindle from a reference axis and producing a detection signal representative of the detected displacement;
    filtering means including a plurality of band-pass filters having different filter characteristics for filtering the detection signal and producing a plurality of filtered detection signals; and
    comparing means including a plurality of comparators for comparing the filtered detection signals with respective reference values to obtain comparison results indicative of different machining states of the workpiece.

11. An apparatus according to claim 10; wherein the band-pass filters have different frequency band-pass characteristics.

12. An apparatus according to claim 11; wherein one of the filters comprises a workpiece rotational frequency band-pass filter for passing a predetermined frequency component corresponding to eccentricity of a machining face of the workpiece.

13. An apparatus according to claim 11; wherein one of the filters comprises a workpiece rotational frequency partial band-pass filter for passing a predetermined frequency component corresponding to distortion of a machining face of the workpiece.

14. An apparatus according to claim 11; wherein one of the filters comprises a tool spindle rotary bending resonant frequency band-pass filter for passing a predetermined frequency component of a rotary bending resonant frequency of the tool spindle corresponding to a machining force of the workpiece.

15. An apparatus according to claim 10; including a smoothing circuit for averaging the detection signal over time and producing an averaged detection signal; and a comparator for comparing the averaged detection signal with a reference value and producing an output signal when neither eccentricity nor distortion are present on a working face of the workpiece.

16. An apparatus according to claim 10; wherein the detecting means comprises a non-contact type detector.

17. An apparatus according to claim 10; wherein the detecting means comprises an optical sensor.

18. An apparatus according to claim 10; wherein the detecting means comprises an electromagnetic induction sensor.

19. An apparatus according to claim 10; wherein the detecting means comprises a capacitance sensor.

20. An apparatus according to claim 10; wherein the detecting means comprise an eddy current sensor.

* * * * *